Nov. 16, 1948.  R. P. MATTERN  2,453,801
METHOD AND APPARATUS FOR COATING
BY THERMAL EVAPORATION
Filed July 27, 1944  5 Sheets-Sheet 3

Inventor
RAYMOND P. MATTERN
By
George H. Fisher
Attorney

Patented Nov. 16, 1948

2,453,801

UNITED STATES PATENT OFFICE 2,453,801

METHOD AND APPARATUS FOR COATING BY THERMAL EVAPORATION

Raymond P. Mattern, Minneapolis, Minn., assignor to Minneapolis-Honeywell Regulator Company, Minneapolis, Minn., a corporation of Delaware Application July 27, 1944, Serial No. 546,866

9 Claims. (Cl. 117—106)

My invention is related to the application of a thin film of a coating substance to an object by evaporation of the coating substance in a vacuum in such a manner that the substance will be condensed on the desired surface.

It is well known that highly polished optical pieces such as lenses, prisms, and the like, produce Fresnel reflections which tend to reduce the transparency of these articles, and it is also known that this effect may be materially reduced by evaporation of certain substances, such as an inorganic salt, so as to condense a thin transparent layer of the evaporated substance on the outer surfaces of the glass articles. My invention consists of a process and apparatus for improving the coating process, for controlling the same, and particularly for accurately regulating the application of a uniform layer of the coating substance to the glass article.

In the practice of the prior art, the coating of lenses and the like was an extremely delicate operation requiring the services of highly skilled technicians, and the cost of the process was such that it could only be applied to glass for use in the most expensive optical instruments. The principal difficulty confronted in the practice of the prior art was in the control of the process so as to obtain a coating of the desired thickness. This feature has been generally recognized as the principal impediment to making the process applicable to optical pieces in the more moderate priced field and for providing easily reproducible results in mass production.

In conducting this process by the evaporation of certain salts an interference tint is produced on the surface of the glass by the condensed salts. As the thickness of the coating is increased, the interference tint gradually changes through several colors of the spectrum, and in the prior art practice this color change was used in various ways to control the operation of the coating process. According to the earliest process, the operator observed the color change, which is noted in reflected light, as the film was deposited on the articles themselves, and the process was terminated when the proper tint became evident. An improvement on this method of control was devised by mounting a sample piece or "monitor" within the evacuable chamber, but somewhat closer to the source of evaporation than the articles whose surface was to be coated. Since a denser layer would naturally form on the "monitor," the operator observed this piece only, and thus the process could be terminated before an excessively dense layer formed on the remainder of the objects. Another method of visual control was to mount a sample piece or "wedge" within the evacuable chamber at an angle to the source of evaporation so that the film formed on this "wedge" would be variable over its angular surface, thereby permitting the operator to select either the proper distance, or the proper amount of evaporable substance to obtain the desired thickness of coating. It will be clearly evident that this method of control even in the hands of a highly skilled technician was at best an approximation of the optimum condition. Still another form of control was found in an arrangement whereby a beam of light was angularly directed to the object under treatment with a filter and photocell arrangement for measuring the reflectance of the treated surface as the process proceeded. By this arrangement, when the reflectance had reached a minimum point as measured by the photoelectric system the process was terminated. All of these arrangements had a common weakness in that they failed to recognize that a certain amount of residual condensation of the evaporable material took place upon the treated surface within the evacuable chamber after the process was terminated and before air was admitted to the chamber. Furthermore, since the evaporable material would coat all of the unobstructed surfaces within its vicinity, a layer of the material condensed on the inner surfaces of the glass enclosure, which thus interfered with either the visual control method or a photometric method since under either process, control was maintained from a point exterior of the evacuable chamber.

Another undesirable feature of the process of coating practiced in the prior art was in the preparation of the coating material or evaporable substance. Although a wide variety of coating substances have been used, magnesium fluoride was a favored choice because of its low refractive index and also because it formed a hard surface which would withstand ordinary handling and washing with soap and water and the common solvents. However, even when obtained in a commercially available "chemically pure" form, magnesium fluoride contained a certain amount of moisture which was either in the form of free moisture or combined as water of crystallization. This moisture was not easily removed, even by prolonged heating in an oven at a temperature in excess of the boiling point of water, but when it was heated to the molten state under vacuum, as it was in the coating process, the moisture escaped and in so doing brought about the undesirable result of spattering. This shortcoming of magnesium fluoride and similar materials was recognized in the prior art, and the result was that various steps were taken to overcome this difficulty as, for example, by heating the metallic salt in a muffle or the like to extremely high temperatures. Treatment of this nature generally had the deleterious effect of forming oxidation products of the metallic salts, such as magnesium oxide, or magnesium oxy-fluoride. These by-products are objectionable in the coating substance, for, among other reasons, their melting points differ from the pure substance and therefore require a wider range of heating for deposition, and, due to their higher refractive indices the films produced have less efficiency than those produced by the pure fluoride.

A further disadvantage of the practice of the prior art was in the arrangement of the articles to be coated with relation to the source of evaporation within the evacuable enclosure. It was the general practice to mount the lenses in suitable holders which were in turn positioned either above or below the evaporation filament. This arrangement of the articles to be coated was not economical in the use of the enclosed space, nor did it make provision for minor variations in the evaporation which materially affect the resultant coating, and frequently small flakes of the heated substance would fall from the evaporation filament onto the surfaces below to thus destroy the uniform coating.

My contribution to the advance of the art of applying the evaporation film to surfaces comprises improvements, in the method of controlling the thickness of the evaporation film; the method of preparing the coating material for use; and in apparatus and methods for properly relating the evaporation source to the article to be coated so as to assure a coating of uniform thickness to a relatively large number of articles in a single operation. More particularly, my process and apparatus have the advantage of being able to accomplish these results on a relatively large scale of production with the services of intelligent, but not necessarily highly skilled technicians.

The principal object of my invention is to provide a method and means for uniformly applying a thin film of coating substance to the desired surface by accurately controlling the quantity of evaporable material and by more advantageously positioning the evaporable substance in relation to the surface which is to be coated.

Another object is to provide a method of preparing a coating substance which is of uniform quality and which will not cause spattering during the coating process, and which is free of undesirable by-products.

A further object is to provide means for quickly arranging a large number of articles to be coated, in proper relation to a source of evaporation within an evacuable enclosure, whereby uniform results are obtainable.

Another object is to provide an improved means for evaporating the coating substance in such a manner as to insure uniform distribution of the vapors within the evacuable enclosure.

Other and further objects and advantages will become apparent from the specification and claims and from the appended drawings in which:

First the preparation of the coating substance, as applied to magnesium fluoride will be explained, although it should be understood that this treatment is equally applicable to any other form of coating substances which consist of inorganic salts. Magnesium fluoride is widely recognized as a suitable substance for the application of low reflective coatings because it forms a coating of high transparency which has a low refractive index, which forms a hard, adhering, insoluble surface which will not be injured by ordinary handling and which will resist washing with soap and water and the common organic solvents. Furthermore, it is well established that to give the most desired result the optical thickness of the coating should approximate one-fourth the thickness of the length of the light wave whose reflectance is to be diminished. This may be measured by the refractive index of the transparent medium and the coating material. Lenses are generally made of either crown glass which has a refractive index of 1.51, or flint glass whose refractive index is 1.65. The refractive index of megnesium fluoride film is 1.36, which is somewhat higher than desired, but this handicap is offset by its otherwise desirable characteristics. For ideal results, the refractive index of the coating substance should be equal to the square root of the refractive index of the glass.

To prepare magnesium fluoride in a form free of moisture and impurities, magnesium chloride is dissolved in distilled water, and the filtered solution is combined with a slight excess of hydrofluoric acid in a platinum dish, and evaporated to dryness. The dish containing the dried compound is then completely dried in a high vacuum furnace at a temperature of 1500° to 1800° F. for about one hour, after which it is allowed to cool in a dessicator. The dried pure powder is then formed into pellets by dry pressing accurately weighed quantities of the powder in a hardened steel die or the like, for use as will be described hereinafter.

Figure 1:
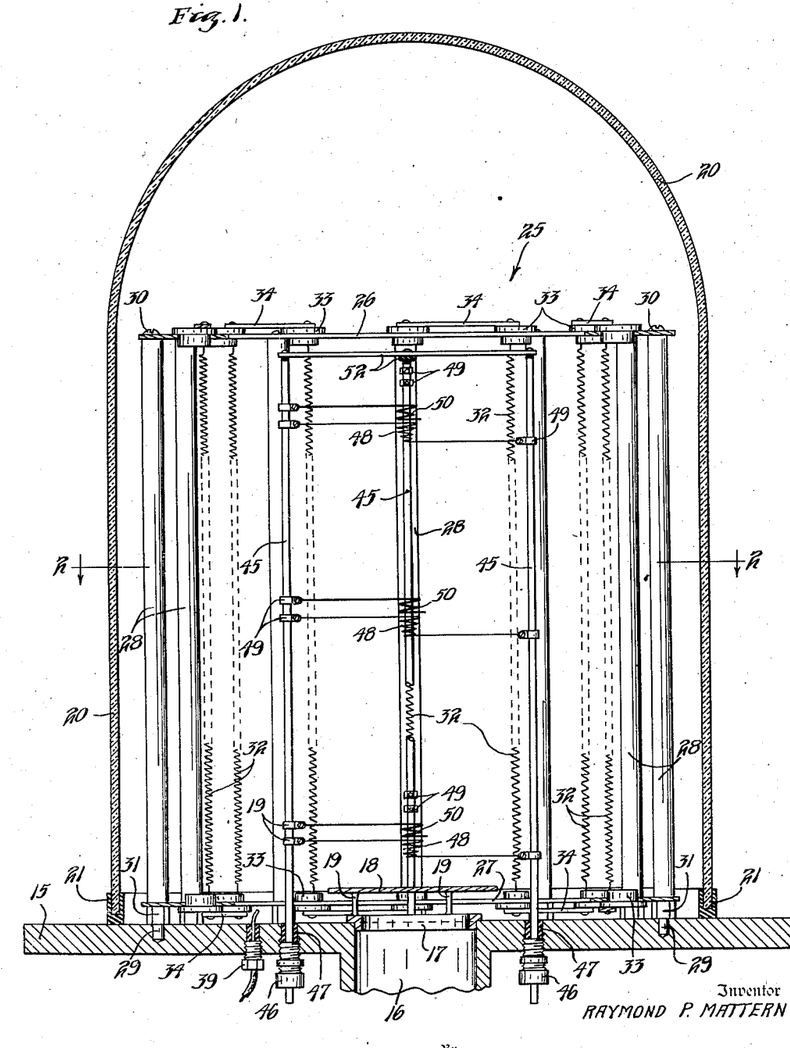
Figure 1 is a vertical cross-section of the apparatus used in performing my process.
Figure 2:
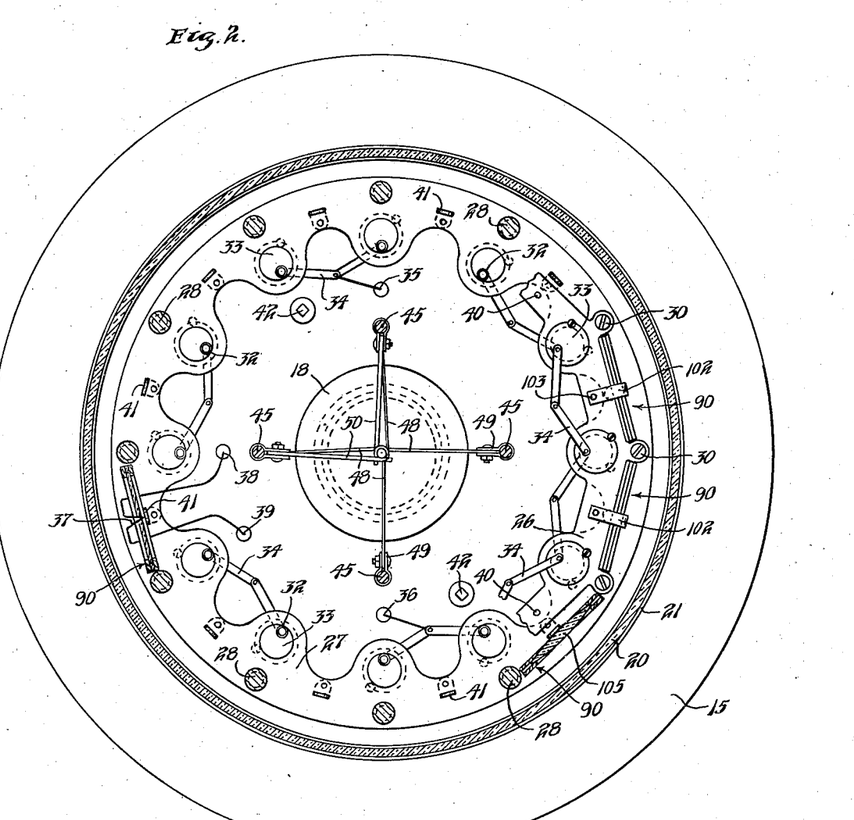
Figure 2 taken approximately on the line 2—2 of Figure 1 is a horizontal cross-sectional view of the apparatus, showing on the right side thereof a broken away portion of the full structure with lens holders mounted thereon.

The apparatus for conducting the process will now be explained in detail. Referring to the drawings and particularly to Figures 1 and 2, the reference numeral 15 indicates a circular metallic base having a large aperture 16 in the center thereof which is in communication with a vacuum pump. A flange 17 supports a baffle plate 18 above the top of the aperture 16 by means of legs 19. The baffle 18 serves to prevent the formation of excessive air currents caused by the vacuum pump and also to prevent objects from falling into the aperture 16. A glass enclosure 20 such as a bell jar is arranged to fit on the plate 15 with a soft gasket 21, which acts as sealing means to permit the evacuation of the bell jar 20 without the inward leakage of atmospheric air. The foregoing structure is commercially available and therefore forms no part of the present invention.

Within the area definable by the enclosure of the bell jar is a structure 25, which consists of an upper ring member 26, and a lower ring member 27, which are held in spaced apart relation by a plurality of supports or posts 28 which are secured within the base 15 by an extension 29. The ring 26 is secured to the top of posts 28 by screws 30 and the ring 27 is held in spaced relation from the base 15 by bushings 31. A plurality of coiled wire electrical heating elements 32 are radially disposed within the structure 25 in spaced relation to the posts 28 and are insulatingly supported on the rings 26 and 27 by a plurality of ceramic insulators 33. The heater elements 32 are connected in series relation with each other by the cross bars 34 to a source of electrical power 35 and 36. The purpose of these heating elements is to furnish radiant heat to the lenses or other articles to be coated and when in operation, the temperature on the inner surfaces of the lenses is measured by a thermocouple 37 which is inserted through an aperture in a sample glass lens mounted in a vertical lens holding structure 90 so that the hot junction of the thermocouple will record the temperature on the inner surface and may therefore be regarded as a representative temperature of all of the lenses supported in the structure. Connections to the thermocouple are shown at 38 and 39.

A plurality of lens holders 90 are circumferentially mounted about the outer periphery of the structure 25 for vertically supporting lenses such as 105 radially about the source of evaporation. The holders 90 which will be described in detail hereinafter have engaging members 102 for support on the upper ring structure 26 by means of pins 103 which are removably inserted in apertures in ring structure 26. Brackets 41 are affixed to the lower ring structure 27 beneath the apertures 40 and furnish abutments for the lower portion of the lens holders 90, when they are mounted on the structure 25.

A pair of high frequency electric discharge devices are represented by the reference numerals 42 and serve to disperse small quantities of air which may be present in the evacuable chamber, prior to the commencement of the coating process.

Figure 3:
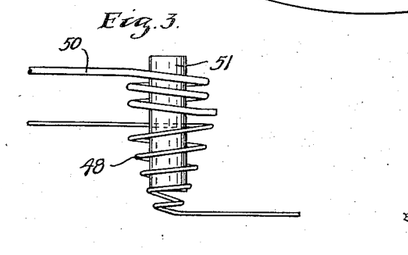
Figure 3 is an enlarged detail of an evaporation filament with a pellet of the coating substance placed within its inner periphery.
Figure 4:
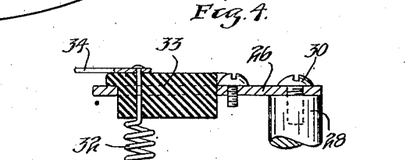
Figure 4 is a detailed view of the upper portion of a supporting structure showing the insulating manner of mounting the lens heaters.

The evaporation means is centrally disposed within the structure 25 in such a manner that the evaporation elements are centrally disposed along the linear axis of the structure. As shown, the structure consists of four posts 45 which extend through the plate 15 and are connected to terminal structures 46 with insulation 47 protecting the posts 45 from electrical contact with the plate 15. The evaporation filaments 48 which are shown in Figure 1 and enlarged in Figure 3 are in the form of a helically wound wire with its opposite ends connected to posts 45 which are in turn connected to a conventional source of power such as alternating current electrical connections. A wire coil 50 may be positioned above the filaments 48 for the purpose of properly centering a pellet 51, disposed in the filament 48 in such a manner as to prevent the pellet from leaning on one side or the other of the filament structure as illustrated in Figure 3. The coiled wire 50, like the filaments 48, is supported on the rods 45 by the clamping means 49 in the manner shown in Figure 1. A supporting rod 52 is shown as being insulatingly connected to opposing pairs of the rods 45 for the purpose of giving rigidity to the structure. In the structure shown, each pair of rods 45 supports and electrically connects three filament members which are equally disposed between the rods. Any number of filaments may be so mounted without altering the spirit of the invention, however, what is of particular importance is the fact that the filaments are centrally disposed within the structure 25 in vertical spaced relation along the central axis. Thus, when the evaporation process is commenced, by this arrangement the articles which are vertically disposed about the central axis will all receive equal benefit from the evaporation.

Figure 5:
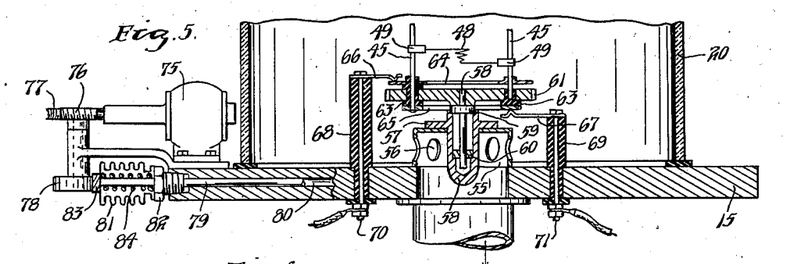
Figures 5, 6, and 7 show the details of a means of rotating an evaporation filament within the evacuable enclosure.
Figure 6:
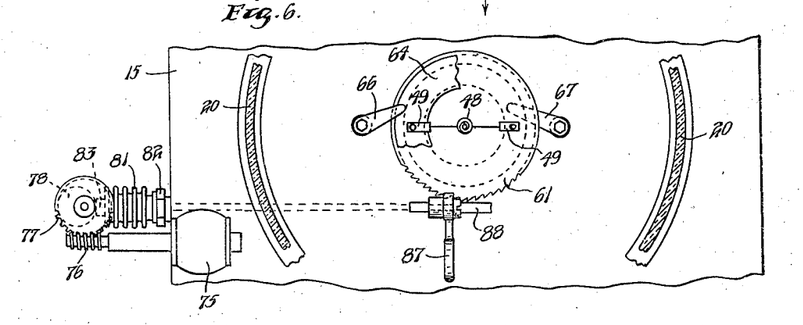
Figure 7:
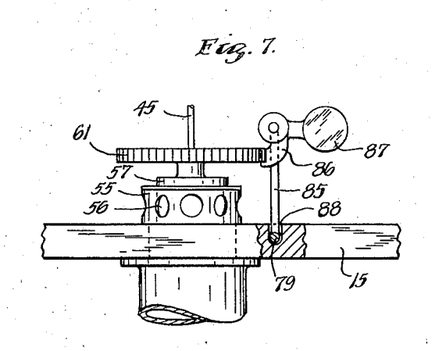

It is of extreme importance that the coating substance 54, be disposed within the evaporation filament so that it is equally distant from all of the objects which are to be uniformly coated, and I have found that even slight variations in the positioning of the substance within the filament disturbs the factor of uniformity. In Figure 3 the coil element 50 is mounted above the filament 48 for the sole purpose of preventing the pellet 54 from falling to one side or the other, for as the substance is heated to a molten state while leaning against one side of the cone 48 it tends to cause unequal distribution within the enclosure. Since this feature is of such importance, I have illustrated in Figures 5, 6, and 7 a modified structure for accomplishing this result by other means. In this modification the filament structure including the supporting members are rotated within structure 25 so as to provide a more uniform distribution of the evaporation material with relation to the vertical structure. To accomplish this result, baffle plate 55 has been substituted for baffle plate 18 and the passage of air from the enclosure to the aperture 16 is provided through the holes 56. A socket structure 57 is suitably mounted in the top of baffle plate 55, into which fits a shaft 58 having bearings 59 and 60 which cooperate with the member 57 to centrally position the shaft and support it on the member 57. A ratchet gear 61 is suitably mounted on the shaft 58 to rotatably support the evaporation structure. The posts 45 bearing filaments 48 supported thereon by the members 49 are insulatingly mounted on the gear 61 and insulated therefrom by non-conducting material 63. A pair of contact rings 64 and 65 are also mounted on the gear 61 and insulated therefrom by the member 63 for the purpose of furnishing current to the filaments. A source of electrical energy is supplied to the members 64 and 65 by contacts 66 and 67 which are insulatingly mounted as at 68 and 69 to terminals 70 and 71, which in turn are connected to a source of electrical energy. A means of rotating the filament structure is provided by motor 75 having a worm gear 76 connected to its drive shaft which meshes with a pinion gear 77 to rotate an eccentric cam 78. The shaft 79 extending through a bore 80 in plate 15 extends through a bellows structure 81 which is suitably sealed to the plate 15 at 82 to make the operation of the shaft vacuum tight. An abutment 83 on the end of shaft 79 engages the eccentric cam 78 so that with each rotation of the cam, the shaft 79 is moved inwardly while a spring 84 positioned within the bellows 81 resiliently holds the abutment 83 in engagement with the cam 78. Within the area defined by the enclosure a second rod 85 is fixed to rod 79 and is pivotally connected to a ratchet pawl 86 which is held in engagement with the ratchet gear 61 by means of weights 87. These elements 85, 86, and 87 move in unison in response to each reciprocating movement of rod 79 to thereby cause the advancement of the ratchet gear 61 on shaft 58. Movement of the structure within the enclosure is permitted by the aperture 88 in plate 15. It will be evident from the foregoing discussion that motor 75 through the driving linkage will be capable of rotating the evaporation structure and that numerous other mechanical means could be supplied for this function within the spirit of the invention, and, furthermore, since the internal structure holding the filaments must be rotated and yet supplied with electrical current, numerous other structures could also be devised for this purpose.

Figure 9:
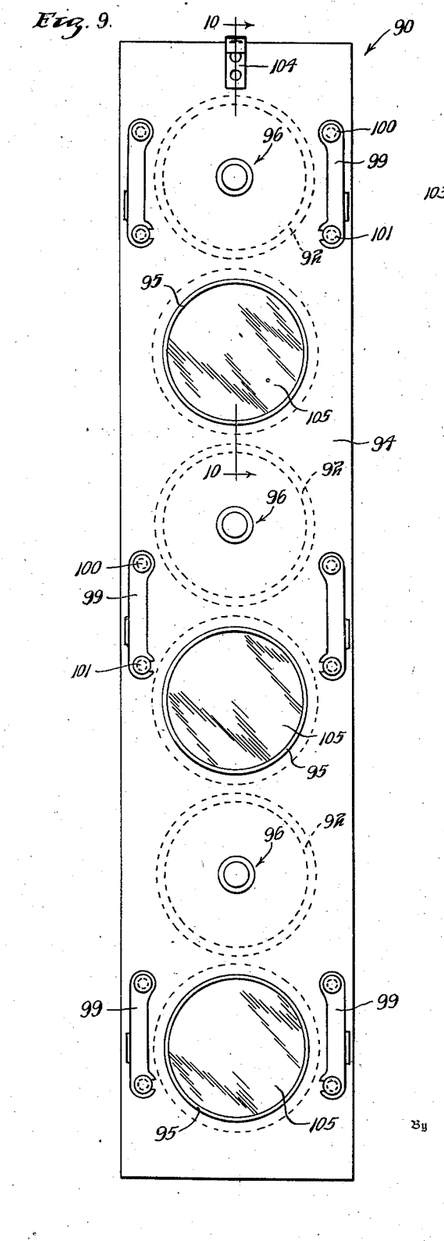
Figures 9 and 10 illustrate an example of means for mounting circular lenses of various types within an improved lens holder, Figure 10 being taken on the line 10—10 of Figure 9.
Figure 10:
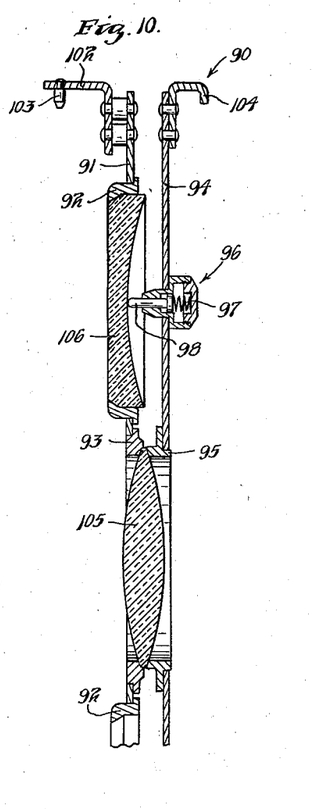

Referring now to Figures 9 and 10, shown are two views of a structure designated by the general reference numeral 90 which is intended for supporting circular lenses and the like in a vertical arrangement about the outer periphery of the structure 25. The details of structure 90 will, insofar as lens supporting means are concerned, assume as many different small details for holding lenses as there are sizes and shapes of lenses to be coated, and it will be evident to anyone skilled in the art that numerous other means could be provided for the same general purpose. The crux of this portion of the invention is that means are provided for vertically mounting the various articles to be coated on suitable structures so that the articles are exposed to the lateral radiation of the vapors. The structures shown in Figures 9 and 10 are primarily intended for supporting pairs of lenses commonly referred to as "doublets" which consist of one member 105 which has two convex lateral surfaces and member 106, which has a plane surface on one side and a concave surface on the other side. One of the convex surfaces of member 105 is ground to coincide with the concave surface of the member 106, therefore in coating a combination lens of this type it is customary to only apply the coating to the outer surface of each member. However, since the inner surfaces of each pair may be specifically ground to coincide, it is advisable that the pairs be kept together during processing, and accordingly an arrangement such as is shown in Figures 9 and 10 is advisable. The structure 90 consists of a pair of plates 91 and 94. Plate 91 has a series of apertures having alternate rings 92 and 93 mounted thereon. The rings 92 are constructed to support by their bevelled edges, lenses such as 106, which have an exposed plane surface, while rings 93 are constructed to support lenses such as 105 having an exposed convex surface. The other plate 94 is provided to fit in the rear of plate 91 and serves to further support the lenses. The plate 94 has intermittent rings 95 to engage the opposite side of the convex lenses and coincide with rings 93. A plurality of resilient structures 96 are provided intermittently with rings 95 for engaging the concave surfaces of lenses 106 and consist of springs 97 which hold pins 98 in contact with the centers of the concave surfaces. The two plates with the lenses mounted therein are secured together by thin levers 99 which are pivotally mounted on plate 94 by studs 100 and which engage studs 101 extending from plate 91 through apertures in plate 94. A mounting bracket 102 is located at the top of plate 91 and is provided with a pin 103 for engagement with an aperture 40 in ring member 26, so that the structure may be vertically mounted thereon. To assure a correct positioning of the member 90 on the structure 25, the lower portion of member 90 will abut a bracket 41 on the lower ring 27. A bracket 104 is located on the top of plate 94 to facilitate handling of the assembled structure 90.

Figure 11:
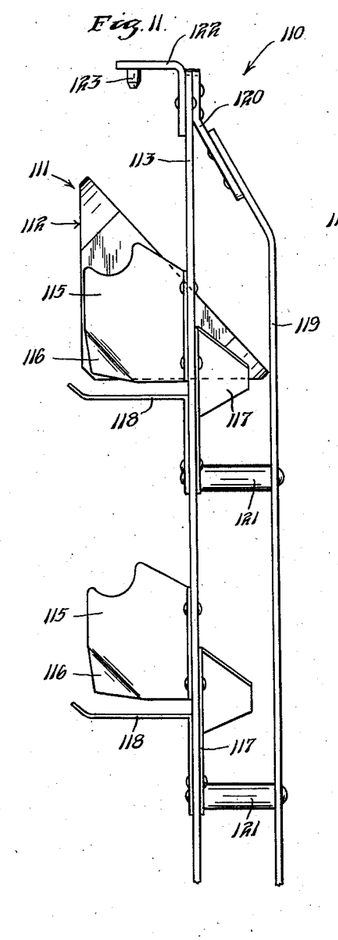
Figures 11 and 12 are illustrative of a form of holder for the coating of surfaces of a prism or other object having a non-circular form.
Figure 12:
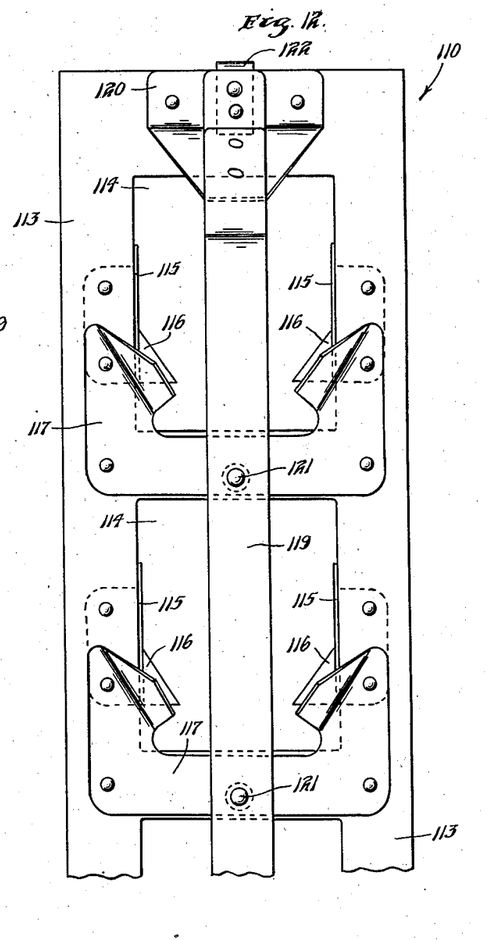

Figures 11 and 12 are side and rear views of a structure 110 which is useful in supporting a prism 111, or similar article, which is to be vertically mounted on structure 25 for the coating of a face indicated by numeral 112. The structure consists of a plate 113 having a plurality of apertures 114. A means of supporting the prism 111 is provided in a forward extending bracket 115 having ears 116 for engaging the side of the prism 111, and a second bracket 117 extending from the rear of plate 113 is provided for securing the rear of the prism. An angular bracket 118 is provided beneath each aperture 114 to prevent the vapors from contacting the base of the prism which is exposed between the brackets 115 and 117. The plate 113 is made rigrid by a strip 119 which is secured to the rear of plate 113 at each end by means of a bracket 120 and the strip 119 is held in spaced relation with plate 113 by studs 121. A mounting bracket 122 is provided with a pin 123 for securing the member 110 on the structure 25 in the same maner as previously described for lens holder 90.

The coating process is conducted as follows: The articles to be coated such as members 105, 106, or 111 are first washed so as to be in a chemically clean state, after which they are rinsed with a moisture absorbent such as freshly distilled dehydrated acetone so as to be clean and free of any moisture, after which they are suitably arranged in holding members such as are indicated by reference numerals 90 or 110. The apparatus is then prepared for use by elevating the bell jar 20, and a plurality of pellets preformed of an accurately weighed quantity of pure magnesium fluoride are deposited in the evaporation filaments 48 by any means which will insure that the pellets may be handled without loss of weight. The article holding members 90 or 110 are then suitably mounted on the structure 25, after which bell jar 20 is lowered so that the soft gasket 21 is firmly in contact with the plate 15. The device is evacuated by a vacuum pump (not shown) drawing the atmosphere within the enclosure out through the aperture 16 until pressure within the enclosure is less than $3 \times 10^{-4}$ millimeters of mercury, and this pressure is maintained throughout the process. The electric discharge current through elements 42 is turned on for approximately five minutes during evacuation to assist in outgassing the contents of the bell jar. The circumferentially positioned heating elements 32 are then turned on to heat the glass articles and with the aid of the thermocouple 37 the temperature of the inner surface of the article is raised to and maintained at a temperature of about 450° F., which is substantially less than the annealing temperature of the glass. When the articles to be coated have been raised to the proper temperature, the circuit to the evaporation elements is turned on so that the filaments assume a dull red color, and held at this temperature for at least 20 minutes, in order to drive off any adsorbed moisture. The evaporation filaments 48 are then further heated until the magnesium fluoride becomes molten and under these conditions the evaporation process takes place in about three minutes. It has been found that the coating is of a better quality if this process can take place as quickly as possible and since the magnesium fluoride is in a dry pure state the process can take place within the time specified. After the completion of the coating process, the heating current to members 32 and 48 is shut off and the device is allowed to cool until the temperature recorded on the thermocouple has descended to less than 280° F. after which the vacuum may be broken and the articles dismantled from their holders for use.

Figure 8:
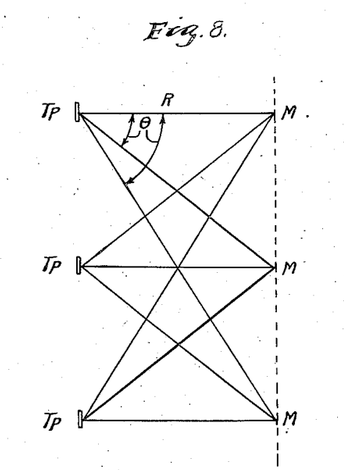
Figure 8 is a diagrammatic illustration of the dispersion of the evaporated coating substance within the enclosure.

As previously pointed out, an important feature of the process consists of a means of control which will provide a coating of a uniform regulated thickness. The thickness of the coating is not necessarily uniform for all devices, but will in fact vary according to the use in which the optical device is to be placed. For example, if the instrument is to be used over massive bodies of water, the coating thickness is regulated so that the point of minimum reflection is at the blue end of the spectrum. This results in maximum transmission of the predominantly blue light existing over large bodies of water. On the other hand, if the instrument is to be used on land or particularly over desert areas where red is the predominant color, the glass is coated such that the point of minimum reflection is at the red end of the spectrum, resulting in maximum transmission at this end of the spectrum. In these two examples it is evident therefore that the thickness of the coating for each type of use will be different but, none the less, the difference of the depth of the layers will be such as to require extreme care in their application. The thickness of the coating film may be regulated by the following formula which is diagrammatically illustrated in Figure 8 of the drawings $$T_p = \frac{M}{4\pi \times D \times R^2} \times \cos\theta N_f$$

where $T_p$ is the point optical thickness of the film, $M$ is the weight of the substance, $D$ is the density of the evaporated film, $R^2$ is the square of the distance from one source of evaporation to the surface to be coated, $\theta$ is an angle formed from a line normal to one source of evaporation and a line to a second source of evaporation, and $N_f$ is the index of refraction of the coated film. In the drawing $T_p$ is represented as being a lens and $M$ is represented as being a pellet of magnesium fluoride.

By an examination of the diagram shown in Figure 8, it will be apparent that the top objective $T_p$ which is on a plane normal with the top mass $M$, will receive the major portion of its coating from this mass, but since it is also exposed to the evaporation taking place at the intermediate and lower masses it will receive a certain amount of material from each of these other sources. The amount of coating which the top objective $T_p$ receives from the intermediate and bottom masses M is successively less and is proportionate to the distance between the objective and the mass and the cosine of the angles formed by a line to the top mass M and lines to the intermediate and lower masses M as shown in the diagram. Likewise the intermediate objective $T_p$ receives the major portion of its coating from the intermediate mass M, but also receives lesser amounts from the top and bottom masses. The bottom objective $T_p$ will in a similar manner receive the major portion of its coating from the bottom mass M, but will also receive successively smaller amounts from the intermediate and top masses. This arrangement is not restricted to the specific number of objectives or masses shown, as either number may be increased and I have found that a plurality of objects arranged as shown in Figures 9–12 may be coated to give a substantially uniform thickness of film on each object with the use of three sources of evaporation.

In actual use I have found that the weight of the pellets must be varied slightly in relation to their position within the structure. This variation is caused by the slight circulation of the residual atmosphere within the enclosure and the evacuating effect of the pump, so that for in one example where I use five pellets being distributed in three groups throughout the structure shown in Figure 1 with two pellets in the top and bottom filaments and a single pellet in the intermediate filament, the weight of each of the top two pellets is actually .047 gram, the intermediate pellet, .048 gram, and each of the two bottom pellets .050 gram. Of course, these weights apply only to a coating of a specified thickness and would be variable for instances.

Since according to the above formula, the distance between the evaporation filaments 48 and the lens to be coated is also an important factor, this effect must also be considered in structures of varying size. However, since the distance between the filaments and the lens will always be a fixed distance, this factor may be regarded as a constant in any specified structure.

The numerous advantages of the process and apparatus described hereinbefore will be evident to any one skilled in the art. The means of regulating the thickness of the coating material by the evaporation of an exact quantity of material at a predetermined definite distance from the object to be coated provides reproducible control of the most exact nature. The use of a pure and moisture free coating substance further enhances the process by assuring that the quantity of material may be mathematically calculated with the assurance that the coated objects will not be injured because of spattering caused by the explosive release of moisture from the coating substance and, with the further assurance that the material does not contain either a useless or harmful by-product. Mounting the objects to be coated within holders which are radially disposed about the source of evaporation permits a far greater number of objects to be coated in any one operation. Further, the means of arranging the source of evaporation so as to provide for even distribution of the evaporable substance provides the assurance that all of the objects to be coated which are mounted within the structure will be coated to a uniform degree. And finally, since the process and apparatus lend themselves to mass production methods, it will be evident that this treatment may now be applied in fields which heretofore were economically unfeasible.

I claim as my invention:

1. In a device for coating an object with a film of substance by evaporation of said substance at reduced pressure, a base member, a first plurality of supporting members radially positioned on said base about a central axis, a pair of spaced apart members located on said supports, a plurality of object supporting members for mounting on one of said spaced apart members, a plurality of electrical heaters insulatingly mounted on said spaced apart members in relation to said object supporting members, a second plurality of supporting members mounted on said base about said central axis, a plurality of evaporation filaments mounted on said second supports equidistant from said object supporting members, and an enclosure cooperable with said base for enclosing said members.

2. In a device for coating an object with a film of substance by evaporation of said substance at reduced pressure, a base member, a first plurality of supporting members radially positioned on said base about a central axis, a pair of spaced apart members located on said supports, a plurality of object supporting members for mounting on one of said spaced apart members, a plurality of electrical heaters insulatingly mounted on said spaced apart members in relation to said object supporting members, a second plurality of supporting members mounted on a rotatable structure, the central axis of said rotatable structure coinciding with the central axis of said base, means for rotating said rotatable structure about said central axis, a plurality of evaporation filaments mounted on said second supports, and an enclosure cooperable with said base for enclosing said members.

3. In apparatus for a process of coating objects with a film of substance by evaporation at reduced pressure, a first structure for mounting a plurality of objects about a central axis, a second structure for supporting an evaporation means on the central axis of said first structure, and means for rotating one of said structures with respect to the other comprising a ratchet gear associated with said rotatable structure, a motor means, and a reciprocating means operatively controlled by said motor means for periodically moving said ratchet gear.

4. In an apparatus for a process of coating objects with a film of substance by evaporation at reduced pressure, a first structure for mounting a plurality of objects about a central axis, a second structure for supporting an electrically heated evaporation means on the central axis of said first structure, means for rotating said second structure with respect to said first structure, means for conducting current to said electrical evaporating means comprising collector members electrically connected to said evaporation means and rotatable with said rotatable structure, and resilient conductors frictionally engaging said collector members for conveying current therethrough.

5. In an apparatus for coating a lens by evaporatively depositing a substance on the outer layer of said lens in a vacuum at elevated temperature, comprising, a base member having a vertical cylindrical supporting structure mounted thereon, a source of evaporation supported by said base member and extending along the central axis of said supporting structure, means for mounting said lens on said supporting structure including a first plate having a lens receiving recess for peripherally supporting a lens therein, a second plate cooperable with said lens and said first plate for supporting said lens between said first and second plates, a pivotal lever mounted at one end thereof to one of said plates, said lever being engageable with a portion of said other plate to hold said plates together but permitting expansion of said lens between said plates by the inherent resilience of said lever, and means carried by one of said plates for vertically mounting said lens in lateral relationship to the source of evaporation.

6. In an apparatus for coating objects by evaporatively depositing a film of substance thereon in a vacuum, a base structure having an evaporating means and an object supporting structure vertically mounted thereon, means for mounting a triangularly shaped prism on said supporting structure in such a manner as to expose only one of its three surfaces to the source of evaporation, comprising, a first bracket carried by said supporting structure having a pair of lateral sides which engage the prism and enclose the sides thereof in such a manner as to expose a first surface of said prism to the source of evaporation, and a second bracket carried by said supporting structure beneath said first bracket for protecting a second surface of said prism from the source of evaporation.

7. In combination; an object supporting structure for mounting a plurality of objects in a predetermined longitudinally and circumferentially spaced relation through a 360 degree cylindrical arc about a central axis, a pellet evaporating and supporting structure for mounting a plurality of pellets of evaporable substance in such predetermined spaced relation along the central axis of said cylindrical arc that evaporation of pellets coats objects mounted by said object supporting structure with uniform coatings of equal thickness, and means for rotating one of said supporting structures with respect to the other.

8. In combination; an object supporting structure for mounting a plurality of objects in a predetermined vertically and circumferentially spaced relation through a 360 degree cylindrical arc about a vertical central axis, a pellet evaporating and supporting structure for mounting a plurality of pellets of predetermined weights of an evaporable substance along the central axis of said cylindrical arc in the same vertical spaced relation as the objects supported by said object supporting structure and parallel thereto, and means for rotating one of said supporting structures with respect to the other.

9. In a process for evaporatively coating a plurality of objects with uniform films of equal thickness comprising the steps of: mounting the objects to be coated cylindrically about a central axis in predetermined spaced relation; mounting, in predetermined spaced relation along the central axis, a plurality of evaporable pellets having such predetermined weights that evaporation of the pellets coats each of the objects with a uniform coating of predetermined equal thickness; evaporating the pellets to completion to deposit the substance on the objects; and rotating the pellets with respect to the objects to aid in obtaining the uniform coatings of predetermined equal thickness on the objects.

RAYMOND P. MATTERN.

REFERENCES CITED

The following references are of record in the file of this patent:

UNITED STATES PATENTS

| Number | Name | Date |
|---|---|---|
| 1,012,192 | Corkery | Dec. 19, 1911 |
| 2,079,784 | Williams | May 11, 1937 |
| 2,123,706 | Biggs | July 12, 1938 |

(Other references on following page)

UNITED STATES PATENTS

| Number | Name | Date |
|---|---|---|
| 2,217,228 | Macksoud | Oct. 8, 1940 |
| 2,220,861 | Blodgett | Nov. 5, 1940 |
| 2,237,328 | Birdseye et al. | Apr. 8, 1941 |
| 2,239,770 | Becker et al. | Apr. 29, 1941 |
| Re. 22,076 | Cartwright et al. | Apr. 21, 1942 |
| 2,281,474 | Cartwright | Apr. 28, 1942 |
| 2,286,819 | Lee | June 16, 1942 |
| 2,301,456 | Sabine | Nov. 10, 1942 |
| 2,337,329 | Hewlett | Dec. 21, 1943 |
| 2,339,613 | Becker et al. | Jan. 18, 1944 |
| 2,341,827 | Sukumlyn | Feb. 15, 1944 |
| 2,351,536 | Osterberg | June 13, 1944 |
| 2,354,521 | Hewlett | July 25, 1944 |
| 2,369,764 | Ullrich | Feb. 20, 1945 |
| 2,397,929 | Dimmick | Apr. 9, 1946 |
| 2,398,382 | Lyon | Apr. 16, 1946 |

FOREIGN PATENTS

| Number | Country | Date |
|---|---|---|
| 484,670 | Great Britain | May 5, 1938 |

OTHER REFERENCES

Strong, "Procedures in Experimental Physics," Prentice-Hall, 1938, pages 170, 176, 177, 178, 179, 182 and 183.